(12) United States Patent
Sperrle

(10) Patent No.: US 11,190,738 B2
(45) Date of Patent: Nov. 30, 2021

(54) VEHICLE STANDSTILL RECOGNITION

(71) Applicant: Robert Bosch GmbH, Stuttgart (DE)

(72) Inventor: Christian Sperrle, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 1154 days.

(21) Appl. No.: 13/828,562

(22) Filed: Mar. 14, 2013

(65) Prior Publication Data

US 2014/0184785 A1    Jul. 3, 2014

Related U.S. Application Data

(60) Provisional application No. 61/746,898, filed on Dec. 28, 2012.

(51) Int. Cl.
| | |
|---|---|
| *H04N 7/18* | (2006.01) |
| *B60T 8/172* | (2006.01) |
| *B60W 40/105* | (2012.01) |
| *B60W 30/18* | (2012.01) |

(52) U.S. Cl.
CPC .............. *H04N 7/183* (2013.01); *B60T 8/172* (2013.01); *B60W 40/105* (2013.01); *B60T 2201/06* (2013.01); *B60T 2210/32* (2013.01); *B60W 30/18118* (2013.01); *B60W 2420/42* (2013.01)

(58) Field of Classification Search
USPC ........................................................ 348/113
See application file for complete search history.

(56) References Cited

U.S. PATENT DOCUMENTS

| | | | |
|---|---|---|---|
| 5,983,161 A | 11/1999 | Lemelson et al. | |
| 6,137,531 A * | 10/2000 | Kanzaki | B60K 31/0008 348/149 |
| 7,170,548 B2 * | 1/2007 | Ishikawa | G06K 9/3241 348/148 |
| 7,221,777 B2 * | 5/2007 | Nagaoka | B60Q 9/008 348/E13.004 |
| 8,280,623 B2 | 10/2012 | Trepagnier et al. | |
| 8,301,341 B2 | 10/2012 | Taguchi | |
| 9,158,978 B2 * | 10/2015 | Forslund | B60R 21/0134 |
| 2006/0039584 A1 * | 2/2006 | Aichi | G06T 7/2053 382/107 |

(Continued)

FOREIGN PATENT DOCUMENTS

| | | |
|---|---|---|
| CN | 1506686 | 6/2004 |
| CN | 101213563 | 7/2008 |

(Continued)

OTHER PUBLICATIONS

International Search Report and Written Opinion for Application No. PCT/US2013/074650 dated Mar. 18, 2014 (8 pages).
Fong, T., "Collaborative Control: A Robot-Centric Model for Vehicle Teleoperation," The Robotics Institute, Carnegie Mellon University, Nov. 2001, 198 pages.

(Continued)

*Primary Examiner* — Susan E. Hodges
(74) *Attorney, Agent, or Firm* — Michael Best & Friedrich LLP

(57) ABSTRACT

A method of determining "true" standstill in a vehicle. The method includes detecting an object outside of the vehicle via a camera, saving first data on the detected object in a memory, detecting the same object after a delay, saving, after the delay, second data on the detected object in a memory, analyzing, by a controller, the first and second data, and determining "true" standstill has occurred based on the analysis.

12 Claims, 5 Drawing Sheets

(56) References Cited

U.S. PATENT DOCUMENTS

| | | | |
|---|---|---|---|
| 2012/0095660 A1* | 4/2012 | Breuer | B60T 7/18 |
| | | | 701/70 |
| 2012/0265402 A1 | 10/2012 | Post, II et al. | |
| 2012/0265418 A1 | 10/2012 | Foerster et al. | |
| 2013/0136309 A1* | 5/2013 | Zhang | G06T 7/2033 |
| | | | 382/104 |
| 2015/0009330 A1* | 1/2015 | Sobue | G08G 1/166 |
| | | | 348/148 |

FOREIGN PATENT DOCUMENTS

| | | |
|---|---|---|
| DE | 19924142 | 11/2000 |
| DE | 102005029866 | 3/2006 |
| EP | 1419683 | 1/2007 |
| EP | 2495149 | 9/2012 |

OTHER PUBLICATIONS

Ozguner, U. et al., "Systems for Safety and Autonomous Behavior in Cars: The DARPA Grand Challenge Experience," Proceedings of the IEEE, Feb. 2007, vol. 95, No. 2, pp. 397-412.

Piyathilaka, L., "Multi-camera visual odometry for skid steered field robot," Information and Automation for Sustainability (ICIAFs), 2010 5th International Conference on, Dec. 17-19, 2010, Abstract Only.

Chinese Patent Office Action for Application No. 201380068294.5 dated Jan. 20, 2017 (14 pages—including tanslation).

2nd Office Action with English translation from the State Intellectual Property Office of the People's Republic of China for Application No. 201380068294.5 dated Sep. 28, 2017 (6 pages).

3rd Office Action with English translation from the State Intellectual Property Office of the People's Republic of China for Application No. 201380068294.5 dated Apr. 19, 2018 (4 pages).

* cited by examiner

VEHICLE STANDSTILL RECOGNITION

RELATED APPLICATION

The present patent application claims the benefit of prior filed co-pending U.S. Provisional Patent Application No. 61/746,898, filed on Dec. 28, 2012, the entire content of which is hereby incorporated by reference.

BACKGROUND

Embodiments of the invention relate to detecting a skidding condition of a vehicle using a forward-facing camera.

More and more vehicles are equipped with a forward-facing video-camera. The camera is mainly used to provide either "fusion" benefits (e.g., a combination of radar and video information to avoid 'false positive' interventions from adaptive cruise control (ACC) systems) or for use in standalone applications (e.g., for automatic control of vehicle lights (e.g., automatic "high beams") or Forward Collision Warning systems).

At the same time "standstill management" functions are becoming more and more popular. Examples of standstill management functions include: adaptive cruise control (ACC) stop & go, automatic vehicle hold (AVH), hill hold control (HHC), and controlled deceleration for parking brake (CDP).

SUMMARY

A "standstill management" function is, in general, included or integrated into an electronic control unit (ECU) of a vehicle. Often, the function is included as part of the electronic stability control (ESC) system. One type of ESC is the ESP system manufactured by Robert Bosch GmbH. The standstill management function becomes active at or during vehicle standstill, either automatically or based on driver input.

Many existing standstill detection methods only work if wheel speed/yaw-rate sensors are fully functional. More particularly, one of two methods is often used to detect a skidding vehicle.

The first method involves releasing a brake pressure in one wheel. The ECU looks for indications that could increase the risk of skidding (e.g., ABS activation at low speeds). If the algorithm has determined a higher risk for skidding, the brake pressure of one non-driven wheel is released as soon as standstill has been detected (based on wheel speeds/edges). Skidding is detected if the non-driven wheel starts turning. When the wheel starts turning, the "standstill management" functions are cancelled.

A disadvantage of the reduced pressure detection method is increased NVH. In this method the return pump in the brake system has to be activated to release the brake pressure from the one wheel.

The second method involves yaw rate monitoring. The yaw-rate sensor signal is analyzed in standstill (based on wheel speeds/edges) to check for a skidding vehicle. If the yaw-rate sensor signal is above a certain threshold, skidding is assumed (or detected) and all "standstill management" functions are canceled.

Unlike these two methods, a video camera can be operated independently of wheel speed, brake pressure, and yaw-rate sensors.

In one embodiment, the invention provides a method of determining "true" standstill in a vehicle. The method includes detecting an object outside of the vehicle via a camera, saving first data on the detected object in a memory, detecting the same object after a delay, saving, after the delay, second data on the detected object in a memory, analyzing, by a controller, the first and second data, and determining "true" standstill has occurred based on the analysis.

In another embodiment, the invention provides a system for determining a "true" standstill condition of a vehicle. The system includes a camera and a controller. The camera is configured to capture an image of objects outside the vehicle. The controller is configured to receive images of objects from the camera, save images received to memory, compare images saved in memory, determine from the comparison of the images in the memory if the vehicle is moving, and provide an indication whether the vehicle is at a "true" standstill.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
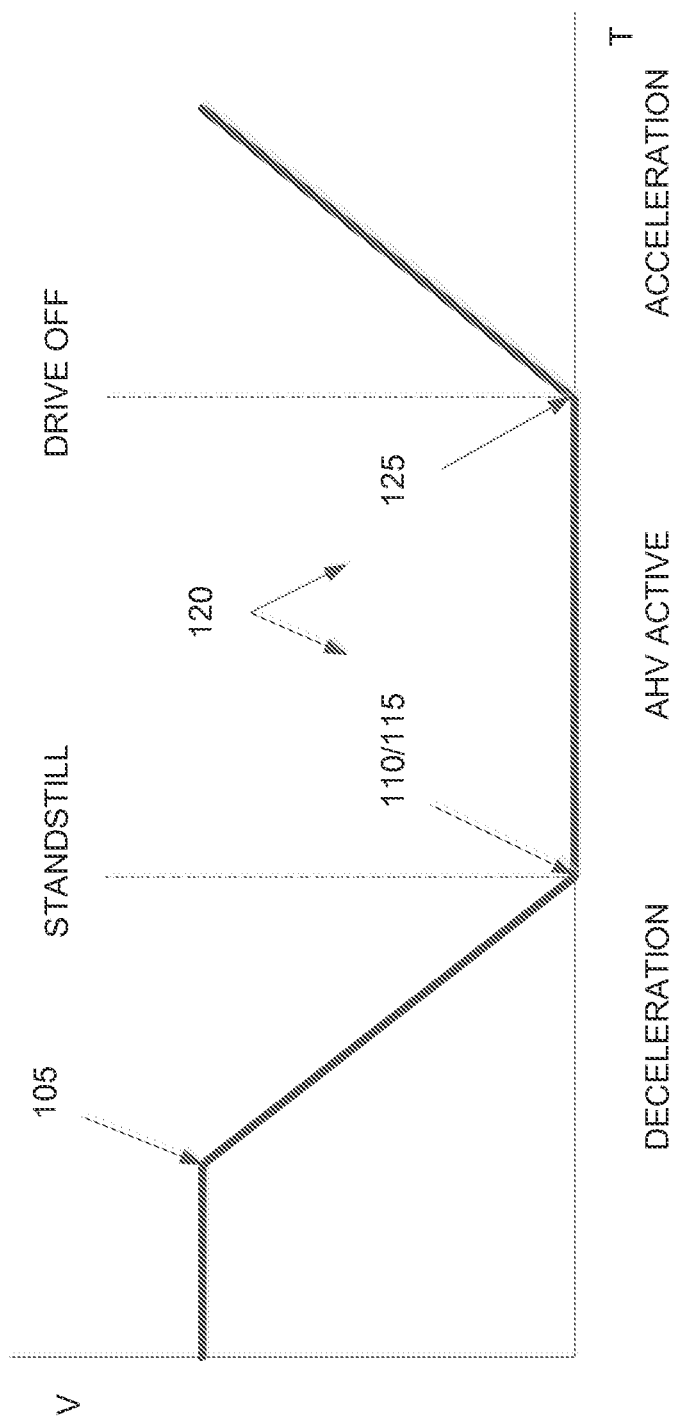
FIG. 1 is a graph of exemplary AVH operation.

As an example, FIG. 1 shows a graph of AVH to illustrate how "standstill management" functions work (other functions such as ACC Stop and Go, HHC, CDP, etc. also have a need to determine true standstill). The horizontal axis of the graph represents time and the vertical axis of the graph represents velocity. In AVH, the driver decelerates the vehicle by stepping on the brake (shown at point 105). A period of deceleration occurs. Once the vehicle stops, the brake pressure provided by the driver is used to hold the vehicle (point 110). The driver then releases the brake pedal (point 115). Following a period of automatic hold, the AVH hands control over to an automated parking brake (point 120), and later the driver steps on the accelerator pedal (requests drive off) and the automated parking brake (APB) is released (point 125). A period of acceleration then follows.

Vehicle standstill is usually determined inside the ESC-ECU by looking at the wheel speed sensor data. As soon as the wheel speeds of all four wheels are below a certain threshold, it is assumed (or detected) that the vehicle is at a 'standstill.' If a more precise determination of vehicle standstill is desired an evaluation of the raw-input of the wheel speed sensor edges is performed. If no edges have been received for a certain amount of time (usually between 300-740 ms) 'standstill' is assumed.

Point 110 on the graph is a critical area where it is necessary to know if the vehicle is in 'true' standstill or is skidding (e.g., with four locked wheels).

It is difficult to differentiate between 'true' standstill and skidding during braking, especially on low-mue surfaces. On such surfaces, it is possible to lock all four wheels at low speeds or close to standstill. A typical situation where this can happen is at the end of an anti-lock braking system (ABS) stop (where ABS is exiting control but the vehicle has not yet reached standstill). The problem is that, based on wheel speed sensor data alone, it is not possible to differentiate between a 'true' standstill and skidding with locked wheels. Knowing the difference however, is important. Erroneously activating a "standstill management" function can lead to a non-steerable vehicle and, thus, endanger the vehicle driver and occupants.

In the case of AVH, for example, this would lead to the current brake pressure being maintained. In AVH, releasing the brake pedal alone does not release the brake pressure. The AVH system releases the brake pressure only if either APB takes over or 'drive off' is detected. Thus, the AVH system will maintain braking unless a skid condition is detected, the APB takes over, or a drive off occurs.

Present AVH systems use the detection methods described above to determine if a skidding condition is occurring such that the brake pressure should be released and control should be returned to the driver.

Once 'skidding' has been detected, the "standstill management" function is cancelled to allow the driver full control of the vehicle. The differentiation between 'true' standstill and skidding is currently performed inside the ESC-ECU.

Figure 2:
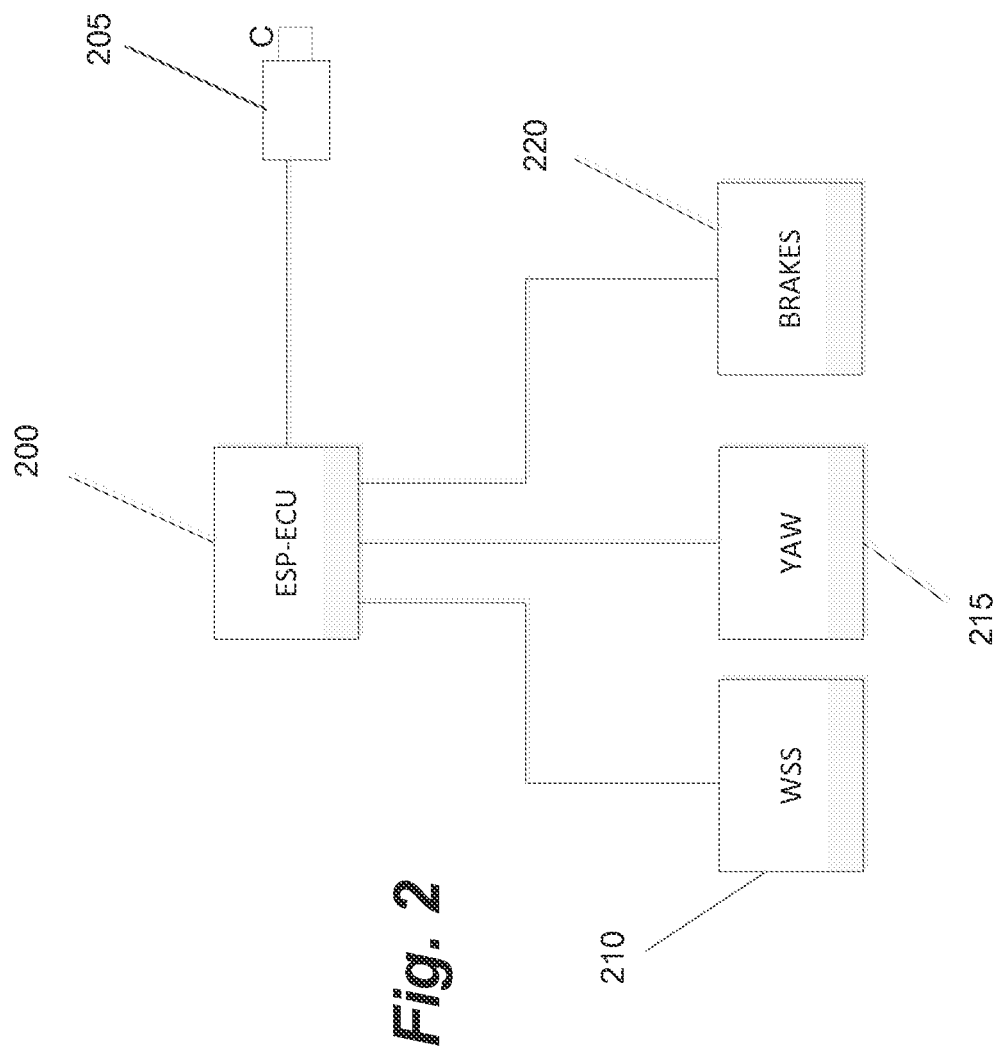
FIG. 2 is a block diagram of an embodiment of a vehicle standstill detection system.

As shown in FIG. 2, one embodiment of the invention includes an ESC-ECU 200 connected to a forward-facing video camera 205, a plurality of wheel speed sensors 210, a yaw rate sensor 215, and a plurality of vehicle brakes 220.

Figure 3:
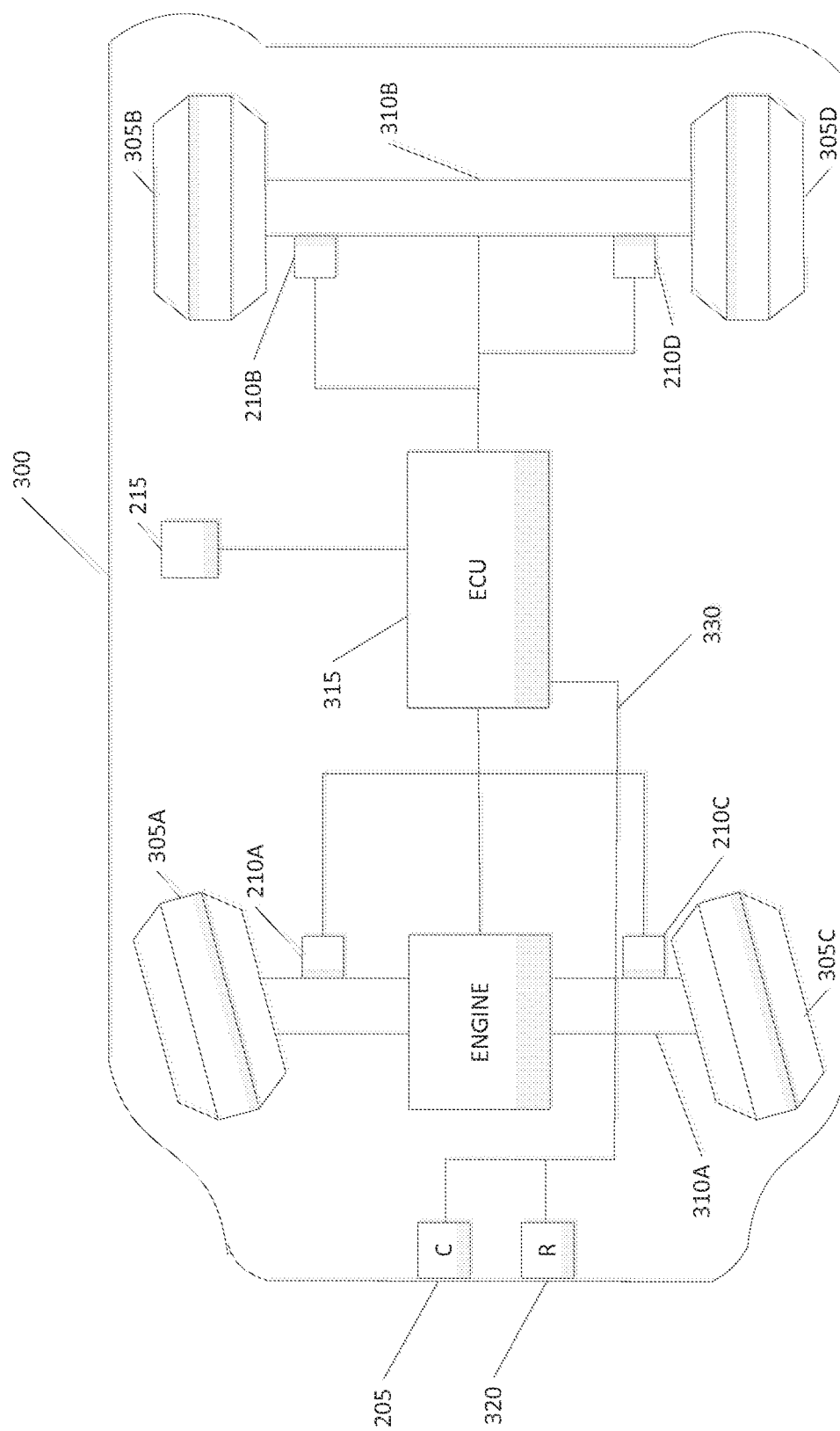
FIG. 3 is a schematic diagram of a vehicle.

FIG. 3 shows a schematic view of a vehicle 300. The vehicle 300 has four wheels 305A, 305B, 305C, and 305D. In some other embodiments, the vehicle 300 can have a different number of wheels. The wheels 305A, 305B, 305C, and 305D are connected to two axles 310A and 310B, as shown. The four wheels are monitored by a plurality of wheel speed sensors 210A, 210B, 210C, and 210D. The wheel speed sensors 210A, 210B, 210C, and 210D are coupled to an electronic processing unit ("ECU") 315 (i.e., a controller). The vehicle 300 also includes other sensors such as a yaw rate sensor 215, a forward facing camera 205, and one or more object detection devices (e.g., radars) 320. In some embodiments, the ECU 315 communicates with other devices (e.g., sensors, other controllers) in the vehicle 300 via a bus 330 (e.g., a CAN bus).

The ECU 315 includes a processor (e.g., a microprocessor, microcontroller, ASIC, DSP, etc.), computer readable media or memory (e.g., flash, ROM, RAM, EEPROM, etc.), which can be internal to the processor, external to the processor, or a combination thereof, and input/output circuitry.

The invention determines 'true' vehicle standstill by using a forward-facing video-camera. An image processing algorithm of the video-camera determines (based on the video image) if the vehicle is at a 'true' standstill or not. In some embodiments, the system identifies objects, and looks at their trajectory, using this information to determine 'true' standstill. To ensure a short detection time, a fixed object (e.g., a traffic sign) is selected/identified/evaluated to determine 'true' standstill. In other embodiments, special lane markings (e.g., "bot-dots") are used because they are already being evaluated by the camera for lane detection.

Figure 4:
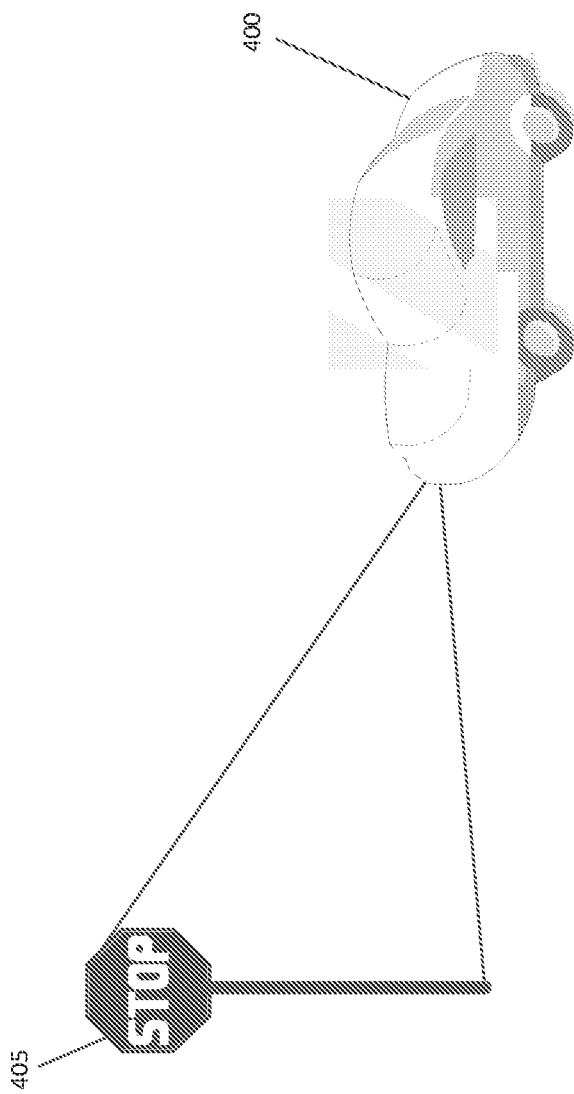
FIG. 4 illustrates the use of a forward-facing video camera to detect a vehicle standstill.

For example, as shown in FIG. 4, a vehicle 400 has a camera that detects a stop sign 405. By evaluating the image of the stop sign 405 (e.g., whether the size of the image is changing), the ESP-ECU can determine whether the vehicle 400 is at a standstill.

A moving object (e.g., a pedestrian crossing the street in front of the vehicle) can also be used. However, since a moving object has more degrees of freedom (e.g., left/right, and forward/backward movements), it is more difficult to evaluate and more time consuming.

The detection time for determining 'true' standstill can be a fixed time period, or can be based on the type of object being used (e.g., shorter for stationary objects, longer for moving objects) or the distance to the object being used (e.g., the closer the object, the shorter the detection time because it is possible to detect changes in the object quicker when it is closer). The detection time is kept as low as possible to have the system react as quickly as possible. In some embodiments, a fast detection time is used and multiple images are saved and compared to determine 'true' standstill. For example, images of an object can be captured very fast (e.g., every 1 msec). If the algorithm determines that two consecutive images have changed, skidding is determined. However, if the algorithm is unable to detect a change in the consecutive images, the system can compare the latest image to earlier images, and determine when the last change occurred. This would allow very quick response where possible, but would also catch skidding that the system could not determine using consecutive images (e.g., during a slow skid).

In some embodiments, 'true' standstill determination is only done below a certain speed threshold. Because wheel lock-up is not very likely at higher speeds (even on low-mue surfaces) it is not necessary to perform 'true' standstill determination until the vehicle's speed is below a predetermined threshold.

The video camera based 'true' standstill information is provided to other ECUs in two ways: (1) the camera constantly provide a 'true' standstill flag via CAN, or (2) the camera provides a 'true' standstill confirmation only (e.g. when requested by another ECU) via CAN.

As noted, knowing the difference between 'true' standstill and skidding/sliding with four locked wheels is important for most "standstill management" functions.

Estimating 'true' vehicle standstill based on the forward-facing camera provides the following advantages:
- independent verification of 'true' standstill (i.e., a completely different calculation method is being used)
- estimation works in the case where the ESC system and/or certain sensors are off due to error (could be beneficial for other ECUs that still require standstill information (e.g. APB))
- estimation will also work in case of noise on one or more sensor signals (whereas the ESC-ECU might have difficulties determining 'true' standstill)
- verification can be performed inside a separate ECU
- 'true' standstill information automatically available on CAN
- no noise/vibration/heat (NVH) concern (as compared to a method that requires the ESC return pump to be activated)
- no extra hardware needed Independent verification of 'true' standstill could be beneficial in regards to compliance with safety standards (e.g., ISO26262) because being able to prevent/mitigate an unintended brake torque (by recognizing the condition and cancelling the "standstill management" function) may lower the testing requirements of vehicle standstill recognition functions (e.g., by lowering an assigned Automotive Safety Integrity Level (ASIL) rating for this function). An improved or second method of determining true vehicle standstill is also beneficial to an "autonomous driving" scenario.

Figure 5:
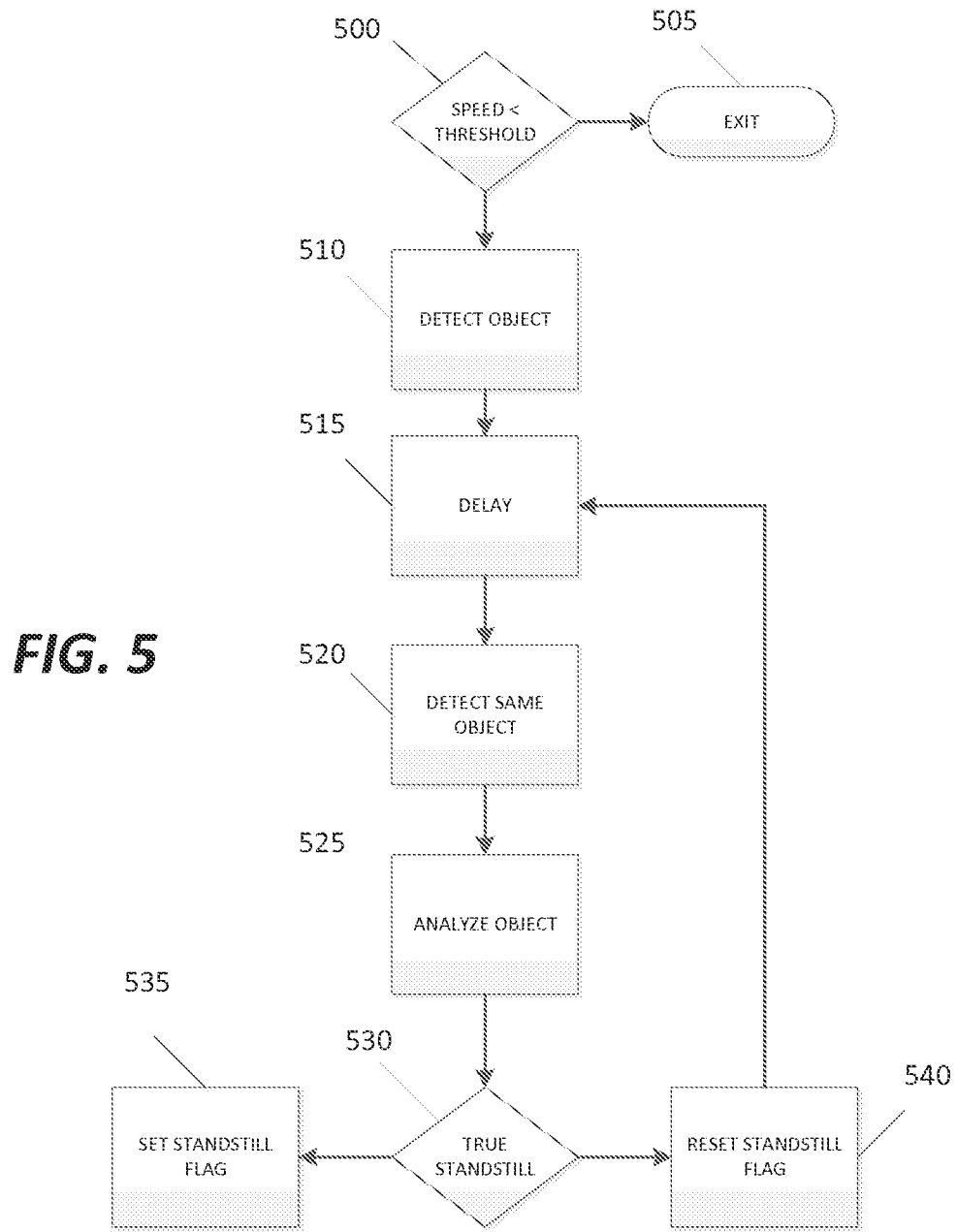
FIG. 5 is a flow chart of the operation of a standstill detection system.

FIG. 5 shows an embodiment of the operation of a standstill detection system. In the embodiment shown, the system checks if the vehicle is traveling slower than a predetermined threshold (step 500). If the speed is greater than the threshold, the standstill detection system does not perform standstill detection and exits (step 505). If the speed is less than the threshold, the system detects an object, via the camera 205, to use in standstill detection (step 510). As described above, the object is generally a fixed object; however mobile objects can be used as well. Next, the system delays for a time period (step 515). The time period can be determined using the speed of the vehicle (e.g., shorter if the vehicle is moving faster), a set time period (e.g., several msec), or variable (e.g., as part of a larger process in the ECU or based on a distance to the object). Following the delay, the same object is again detected (step 520) and analyzed (step 525). The analysis determines if the detected features of the object have changed from the prior detection of the object, and whether this change is indicative of movement of the vehicle. The system then determines if, based on the analysis, the vehicle is truly standing still (step 530). If the vehicle is in true standstill, the system set a standstill flag (step 535), if not, the system resets the standstill flag (step 540) and loops back to delay again (step 515) and continue to check for true standstill. As described above, the standstill flag can continuously be made available (e.g., via CAN bus) or can be provided when requested by another system.

Thus, the invention provides, among other things, a system and method for determining true standstill of a vehicle.

What is claimed is:

1. A method of determining when a vehicle is at a standstill, the method comprising:
   receiving an indication from a sensor that the vehicle is at a standstill;
   setting a standstill flag when the indication received from the sensor indicates the vehicle is at a standstill;
   detecting an object outside of the vehicle via a camera;
   saving first data on the detected object in a memory;
   detecting the same object after a delay;
   saving, after the delay, second data on the detected object in a memory;
   analyzing, by a controller, the first and second data;
   determining whether the vehicle is moving based on the analysis;
   resetting the standstill flag when, based on the analysis, a determination is made that the vehicle is moving; and
   performing standstill functions when the standstill flag is set.

2. The method of claim 1, wherein the detecting steps are performed by a camera and the first and second data are images of the detected object.

3. The method of claim 1, wherein the detected object is a stationary object.

4. The method of claim 1, wherein the detected object is a moving object.

5. The method of claim 1, further comprising providing an indication of a standstill condition when requested.

6. The method of claim 1, further comprising continuously providing an indication of a standstill condition on a bus in the vehicle.

7. A system for determining a "true" standstill condition of a vehicle, the system comprising:
   a sensor configured to detect movement of the vehicle;
   a camera configured to capture an image of objects outside the vehicle; and
   a controller configured to
      receive an indication from the sensor that the vehicle is at a standstill,
      set a standstill flag when the indication that the vehicle is at a standstill is received from the sensor,
      receive images of objects from the camera,
      save images received to memory,
      compare images saved in memory,
      determine from the comparison of the images in the memory if the vehicle is moving,
      resetting the standstill flag when the determination whether the vehicle is at a standstill indicates that the vehicle is moving,
      perform standstill functions when the standstill flag is set, and
      provide an indication whether the vehicle is at a standstill.

8. The system of claim 1, wherein the captured objects are a stationary object.

9. The system of claim 1, wherein the captured object is a moving object.

10. The system of claim 1, wherein the controller provides an indication of a standstill condition when requested.

11. The system of claim 1, further comprising a bus the controller continuously providing an indication of a standstill condition on the bus.

12. The system of claim 1, wherein the standstill functions include at least one of adaptive cruise control (ACC) stop & go, automatic vehicle hold (AVH), hill hold control (HHC), and controlled deceleration for parking brake (CDP).

* * * * *